(12) United States Patent
Busardo et al.

(10) Patent No.: US 10,737,242 B2
(45) Date of Patent: Aug. 11, 2020

(54) METHOD OF TREATING POWDER MADE FROM CERIUM OXIDE USING AN ION BEAM

(71) Applicant: IONICS FRANCE, Hérouville-Saint-Clair (FR)

(72) Inventors: Denis Busardo, Gonneville-sur-Mer (FR); Frederic Guernalec, Liffre (FR)

(73) Assignee: IONICS FRANCE, Hérouville-Saint-Clair (FR)

( * ) Notice: Subject to any disclaimer, the term of this patent is extended or adjusted under 35 U.S.C. 154(b) by 53 days.

(21) Appl. No.: 15/967,475

(22) Filed: Apr. 30, 2018

(65) Prior Publication Data

US 2018/0243726 A1    Aug. 30, 2018

Related U.S. Application Data

(63) Continuation of application No. 14/909,363, filed as application No. PCT/FR2014/051919 on Jul. 24, 2014, now Pat. No. 9,981,249.

(30) Foreign Application Priority Data

Aug. 1, 2013  (FR) ..................................... 13 01847

(51) Int. Cl.
*B01J 23/10* (2006.01)
*C04B 35/50* (2006.01)
(Continued)

(52) U.S. Cl.
CPC ............. *B01J 23/10* (2013.01); *B01J 37/347* (2013.01); *C01F 17/206* (2020.01); *C01G 25/00* (2013.01);
(Continued)

(58) Field of Classification Search
CPC ...... B01J 23/10; B01J 37/347; C01F 17/0043; C01G 25/00; C01G 25/006; C04B 35/50
See application file for complete search history.

(56) References Cited

U.S. PATENT DOCUMENTS

2004/0038106 A1    2/2004  Saito et al.
2013/0023709 A1*   1/2013  Cizeron ................. B01J 23/002
                                                        585/324

FOREIGN PATENT DOCUMENTS

CN        102362006 A       2/2012
EP         2396447 A1 *    12/2011    ......... C23C 14/5833

OTHER PUBLICATIONS

Naganuma et al., Stability of the Ce3+ valence state in cerium oxide nanoparticle layers, Nanoscale, 4(16):4950-3 (2012).
(Continued)

*Primary Examiner* — James A Fiorito
(74) *Attorney, Agent, or Firm* — Marshall, Gerstein & Borun LLP

(57) ABSTRACT

A method of treating a powder (P) made from cerium oxide using an ion beam (F) in which: —the powder is stirred once or a plurality of times; —the ions of the ion beam are selected from the ions of the elements of the list consisting of helium (He), boron (B), carbon (C), nitrogen (N), oxygen (O), neon (Ne), argon (Ar), krypton (Kr), xenon (Xe)—the acceleration voltage of the ions of the beam is between 10 kV and 1000 kV; —the treatment temperature of the powder (P) is less than or equal to Tf/3; —the ion dose per mass unit of powder to be treated is chosen from a range of between 1016 ions/g and 1022 ions/cm2 so as to lower the reduction temperature of the powder made from cerium oxide (P).

13 Claims, 5 Drawing Sheets

(51) Int. Cl.
    C01G 25/00      (2006.01)
    C01F 17/206     (2020.01)
    B01J 37/34      (2006.01)
(52) U.S. Cl.
    CPC ............ *C01G 25/006* (2013.01); *C04B 35/50* (2013.01); *C04B 2235/32* (2013.01); *C04B 2235/3244* (2013.01)

(56) References Cited

OTHER PUBLICATIONS

Trovarelli et al., The utilization of ceria in industrial catalysis, Catalysis Today, 50:353-67 (1999).
Kaspar et al., Use of CeO2-based oxides in the three-way catalysis, Catalysis Today, 50:285-98 (1999).
International Application No. PCT/FR2014/051919, International Search Report and Written Opinion(translation), dated Nov. 24, 2014.
Liu et al., Comparative XPS study of surface reduction for nanocrystalline and microcrystalline ceria powder, Appl. Surface Sci., 252(14):4931-5 (2006).
International Application No. PCT/FR2014/051919, International Preliminary Report on Patentability, dated Feb. 2, 2016.

\* cited by examiner

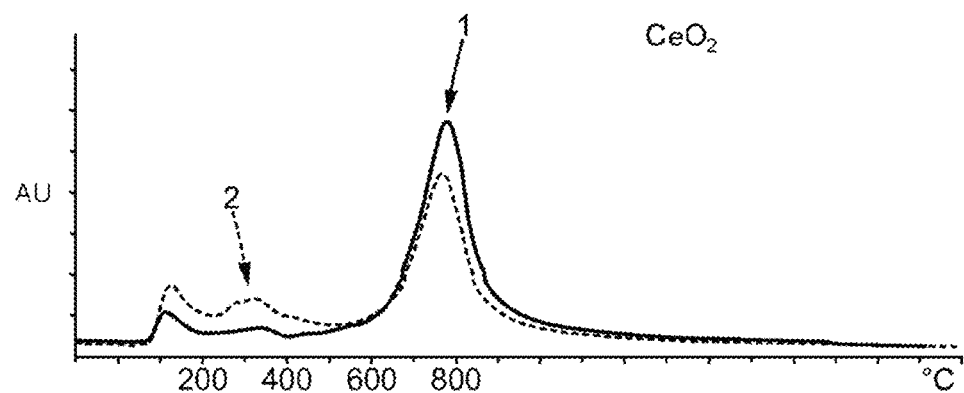
FIG. 2.a
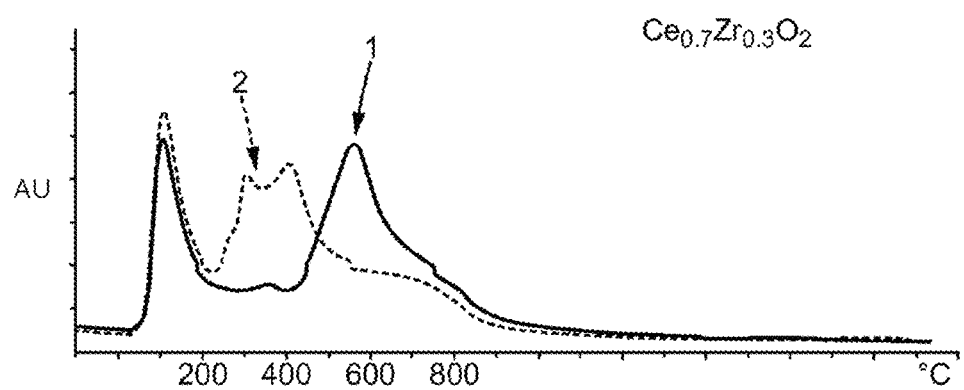
FIG. 2.b

METHOD OF TREATING POWDER MADE FROM CERIUM OXIDE USING AN ION BEAM

CROSS REFERENCE TO RELATED APPLICATIONS

This application is a continuation of U.S. patent application Ser. No. 14/909,363, which is a U.S national phase of International Patent Application No. PCT/FR2014/051919 filed Jul. 24, 2014, which in turn claims the priority benefit of France Patent Application No. FR1301847 filed Aug. 1, 2013, the respective disclosure of which are each incorporated herein by reference in their entireties.

BACKGROUND OF THE INVENTION

A subject matter of the invention is a process for the treatment by an ion beam of a powder based on cerium oxide, in particular of a promoter based on cerium oxide, with the aim of increasing the mobility of the oxygen at the surface of and inside the promoter, of reducing the temperature for reduction of the promoter, of increasing the yield of the reactions with which the promoter is associated and of reducing the amount of catalyst, the catalytic power of which it promotes.

It should be remembered that, in catalysis, a promoter is a compound, generally provided in the powder form, which increases the catalytic power of a catalyst, without itself having an intrinsic catalytic power.

Promoter based on cerium oxide is understood to mean a promoter comprising at least one atom of cerium and of oxygen. This family of promoters is known for its ability to store and to release oxygen and is used in particular in motor vehicle mufflers. Promoters based on cerium oxide act as a reservoir of oxygen for oxidation/reduction reactions involving the $Ce^{4+}/Ce^{3+}$ pair. They make it possible, for example, to increase the three-way catalytic deposition effectiveness by widening the air/fuel adjustment window.

For some years, the problems related to the environment have been increasing in scale. One of the major problems is the atmospheric pollution caused by motor vehicles. In order to limit pollution by motor vehicles and in particular emissions of carbon monoxide (CO), hydrocarbons (HC), and nitrogen oxides (NOx), cars have been progressively equipped with catalytic converters. The role of the latter is to convert harmful pollutant molecules (CO, HC and NOx) into nontoxic entities ($CO_2$, $N_2$ and $H_2O$): this is "three-way" catalysis. In recent years, ceria-zirconia solid solutions have appeared dominant in the formulations of three-way catalysts at the expense of ceria, as they exhibit a high oxygen storage capacity and furthermore withstand high-temperature treatments. However, the conditions of use of catalytic converters during startup of the engines under cold conditions make desirable, indeed even force, a further improvement in the redox efficiency of these oxides at low temperature. Recent studies on the Ce—Sn—O ternary system indicate that $Ce_2Sn_2O_7$—$Ce_2Sn_2O_8$ oxides of pyrochlore type also exhibit oxygen storage properties.

This results in a need for a method for the treatment of powders based on cerium oxide, in particular of promoters in the powder form based on cerium oxide, exhibiting an improved redox efficiency at low temperature, preferably according to methods which can be easily operated on the industrial scale, so as to be able to present such powders, in particular promoters, in a significant amount and at reasonable costs.

SUMMARY OF THE INVENTION

It is an aim of the invention to present a method for the production of cerium oxide promoter in the powder form which is relatively inexpensive and which makes it possible to obtain amounts of powders corresponding to the requirements of numerous applications.

The invention thus provides a process for the treatment by an ion beam of a cerium oxide powder, in particular of a cerium oxide promoter in the powder form, where:
 the powder is mixed one or more times during the treatment;
 the ions of the ion beam are selected from the ions of the elements of the list consisting of helium (He), boron (B), carbon (C), nitrogen (N), oxygen (O), neon (Ne), argon (Ar), krypton (Kr) and xenon (Xe);
 the acceleration voltage of the ions is greater than or equal to 10 kV and less than or equal to 1000 kV;
 the temperature of the powder is less than or equal to $T_m/3$, where $T_m$ is the melting point of said powder and is expressed in kelvins;
 the cumulative total dose of ions at the end of the treatment per unit of weight of powder to be treated is chosen within a range of between $10^{16}$ ions/gram of powder and $10^{22}$ ions/gram of powder in order to reduce the temperature for reduction of the powder based on cerium oxide.

In the context of the present invention, "to mix" or "mixing" is understood to mean the fact of stirring a powder so as to mingle the grains thereof.

According to one embodiment, the cumulative total dose of ions at the end of the treatment per unit of weight of powder to be treated within a range is between $10^{18}$ ions/gram of powder and $10^{20}$ ions/gram of powder.

According to one embodiment, the powder is arranged in the form of a layer of powder, and the layer of powder is mixed one or more times according to a repetitive out-of-beam process, which can consist, for example, before each treatment, in combining the powder into a point of the treatment area and in then spreading it again by means of a fine brush over the same spreading surface. This spread powder exhibits a mean thickness substantially equal to its weight divided by the product of its density and its spreading surface area. In view of the limited distance covered by the ions in the powder, which can be less than the spreading thickness of the powder, it may be desirable to repeat this spreading operation a certain number of times in order to make it possible for the grains located in deep layers, not affected by the beam, to have a sufficiently high probability of being exposed at least once to the beam. This mixing method is not limiting; it might, for example, be possible to choose another continuous method of mixing under a beam by means of a vibrating device (bowl, plate, and the like) which collects, mixes and exposes the powder to the beam throughout the treatment.

According to one embodiment which makes it possible to ensure optimum mixing, the mixing of the powder is repeated a minimum number of times in order to have the assurance that a significant amount of powder grains in order to obtain an effect on the decrease in the reduction temperature have been statistically subjected to the treatment. The inventors have been able to experimentally confirm that this minimum number of times corresponds to the following rule: the minimum number of times is approximately equal to the thickness of the powder spread over the surface divided by the distance covered by the ions of the beam in the powder; this number must be greater than or equal to 2 in order to prevent negative edge effects. The distance covered by the ions can be estimated by software developed and sold in order to facilitate or carry out such calculations, such as, for example, the software sold under the "SRIM" ("*The Stopping and Range of Ions in Matter*") and "TRIM" ("*The Transport of Ions in Matter*") names, which have been developed in particular by James F. Ziegler.

As can be indicated above, according to another embodiment, the powder is mixed under a beam by vibrating it during the treatment (for example in a vibrating bowl or plate), so as to make it possible for the powder grains located in the deep layers to have a significant probability of rising to the surface in order to be exposed at least once to the beam during the treatment. It may be considered that the duration of the treatment depends on the total dose of ions required to treat a given amount of powder (expressed in grams) with a beam of fixed intensity. It is desirable for the treatment to be sufficiently effective to make it possible for a significant amount of grains to be treated in order to obtain the desired effect under optimum conditions. For high intensity, in other words for a rather short treatment time, it is desirable to favor very efficient and thus expensive mixing means (for example, ultrasonic mixing means) in order to make it possible for the powder grains to have a not insignificant probability of being exposed at least once under the beam. On the other hand, if the mixing of the powder proves to be excessively slow due to the use of less expensive means, it is possible to envisage reducing the beam intensity and thus increasing the treatment time in order to make it possible for the powder grains to have a greater probability of being exposed to the beam. Poor mixing may be reflected by overexposure of some grains to the beam, which can be harmful by excessive dosing to the optimum effect desired, to the detriment of other grains, which themselves may remain unexposed to any treatment.

The inventors have been able to establish the two relevant parameters of the ion beam which make it possible to obtain the effect desired by the process of the invention: the acceleration voltage of the ions and the treatment dose (expressed in number of ions) relative to an amount of powder to be treated (expressed in grams), that is to say the cumulative total dose of ions at the end of the treatment per unit weight of powder to be treated.

The degree of treatment of the powder can be associated with the effectiveness of the mixing carried out by various and varied means, in particular according to nonlimiting forms, two examples of which have been mentioned above. For a treatment dose (expressed in number of ions) associated with an amount of powder (expressed in grams), "degree of treatment of a powder" denotes the ratio of the number of grains of powder which have been exposed at least once to the beam, with respect to the total number of grains of starting powder. For example, for a degree of 90%, it is estimated that 10% of the grains have not been exposed to the beam due to being maintained, throughout the treatment, in deep layers not affected by the ions of the beam. 90% of remaining grains were exposed at least once, indeed even several times. This degree of treatment, of between 0% (the powder is unexposed) and tending towards 100% without ever reaching it (since there existed no certainty statistically for whether it is), constitutes a characteristic quantity which quantifies the effectiveness of mixing of the powder. This degree of treatment corresponds to the probability for a grain of powder to be treated once, indeed even several times.

According to one embodiment of the process of the present invention, a powder based on cerium oxide after treatment is composed of treated or untreated grains, each grain being treated one or more times, partially or completely over its entire surface, in a thickness not exceeding the distance covered by the ion, in order to increase the mobility of the oxygen at the surface and in the body, in order to decrease the temperature for reduction of said powder.

According to one embodiment, for a fixed dose of ions relative to a given amount of powder, the required degree of treatment of the powder is greater than or equal to 10%. According to one embodiment, the required degree of treatment of the powder is greater than or equal to 50% and does not exceed 80%. The desired effect can thus be accentuated with relatively acceptable treatment times.

Generally but nonlimitingly, the powder based on cerium oxide is composed of grains of different shape (which can be approximated under spherical form) and size. The distribution in size can be established by particle size analysis, which is the study of the statistical distribution of the sizes of a collection of finished components of natural or fractional material. The particle size analysis is the combination of operations which make it possible to determine the distribution of the sizes of the components making up the collection. The powder based on cerium oxide is generally composed of grains, the size of which can vary from 10 nm to 5 micrometers, with a very high proportion of grains with a mean size corresponding to approximately 100 nanometers, in other words with a size substantially comparable to the distance covered by the ions of the beam. It is possible, without being too mistaken, to estimate that the powder grains can be traversed right through by the ions, leaving not much grain surface untreated.

The powder grains can be dense or porous. They are generally provided in the form of multiple channels for facilitating circulating of the oxygen.

The choice of the bombardment conditions and of the mixing conditions according to the invention makes it possible to advantageously obtain powders based on cerium oxide exhibiting a high mobility of the oxygen at the surface and in depth, and also a decrease in their reduction temperature.

The inventors have been able to find that the ranges chosen according to the invention, in combination with the type of the ionic bombardment ions, and relating to the acceleration voltage (in other words, the energy) and the dose of ions per unit of weight of powders to be treated, make it possible to select experimental conditions where the production of powders based on cerium oxide exhibits advantageous properties. In order to optimize the results, it may be of use to consider the degree of treatment of the powder grains.

In addition, they have been able to find that the process according to the invention can be carried out "under cold conditions", in particular at ambient temperature, and that it is advisable for the temperature of the cerium-based powder to remain less than or equal to the value $T_m/3$ during the implementation of the process. It is thus advantageously possible to prevent the powder grains from splitting or melting. The $T_m$ value of cerium oxide is approximately 2400° C., i.e. 2673 K; the $T_m/3$ value of cerium oxide is thus approximately 890 K, i.e. approximately 620° C.

Without wishing to be committed to any one scientific theory, it may be thought that the bombardment of the ions under the conditions according to the invention produces the effect of a "nanopiercing" at the nanometric scale by virtue of which nanoholes are created by the impact of the ions in the powder, in particular in the porous structure of the powder. These nanoholes make possible better circulation of the oxygen, both with regard to storage and with regard to release. Within the meaning of the present invention, nanoholes are empty spaces, the greatest dimension of which is greater than or equal to 10 nanometers and the smallest dimension of which is greater than or equal to one nanometer. These nanoholes have a depth which is in keeping with the distance covered by the ion in the powder, and a diameter which is in keeping with the weight and the energy of the incident ion. For a light ion, the nanoholes are generally long (for example, a few hundred nm) and narrow (for example, a few nm, indeed even a few tens of nm); for heavier ions, the holes are generally shorter and broader.

According to different embodiments, which can be combined with one another:
- the dose of ions per unit of weight of greater than or equal to $10^{18}$ ion/g of powder to be treated and/or less than or equal to $10^{20}$ ion/g of powder to be treated;
- the powder is spread over a surface before each treatment, which can be repeated one or more times, or also mixed under a beam during the treatment by a vibrating device (for example a vibrating bowl or a vibrating plate);
- the acceleration voltage of the ions is between 20 kV and 200 kV;
- the ions are produced by an electron cyclotron resonance (ECR) source which has the advantage of being compact and sparing in energy;
- the grains of said powder exhibit a degree of treatment of between 1% and 99%; according to one embodiment, the degree of treatment of the powder is greater than or equal to 10%, preferably greater than 50%.

According to one embodiment of the process according to the invention, the treatment of the powder in order to create long and narrow holes is carried out with light ions chosen from the ions of the elements of the list consisting of helium (He), boron (B), carbon (C), nitrogen (N), oxygen (O) and neon (Ne). The choice of light ions can make possible an advantageous oxygen storage or release mechanism.

According to different embodiments of the process according to the present invention, which can be combined with one another:
- the spreading surface area of the powder is calculated in order to form the thickness of the powder to be at least equal to twice the distance covered by the ion in said powder;
- the spreading surface of the powder or a vibrating device (for example a vibrating bowl or plate) in which the powder is found are movable with respect to the ion beam at a rate, $R_{FP}$, of between 0.1 mm/s and 1000 mm/s. The rate of forward progression, $R_{FP}$, can be unchanging or variable. According to one embodiment, the spreading surface of the powder or the vibrating device moves and the ion beam is stationary. According to another embodiment, the ion beam scans the spreading surface or the vibrating device where the powder to be treated is found. It is also possible for the spreading surface or the vibrating device to move when the ion beam is movable. According to one embodiment, the spreading surface or the vibrating device move under the ion beam according to a plurality, N, of passes at the rate $R_{FP}$. It is thus possible to treat the powder with a total dose of ions corresponding to the sum of the doses of ions received by the spreading surface or the vibrating device on conclusion of the N passes. It is also noted that, if the surface power density of the beam makes it possible for the powder to remain at an acceptable temperature during the treatment, the treatment can be static and result from one or more flashes of ions; the number and the duration of the flashes are regulated in order to achieve the dose required, at an acceptable temperature, after each mixing out-of-beam or during mixing under a beam with a vibrating device;
- the powder based on cerium oxide is chosen from the list consisting of a ceria ($CeO_2$) powder and a mixed cerium and zirconium oxide powder, for example a ceria-zirconia ($Ce_{0.7}Zr_{0.3}O_2$) powder.

The invention is also targeted at a powder based on cerium oxide, where the grains of said powder exhibit a degree of treatment of between 1% and 99%, comprising nano-holes.

The invention also relates to a heterogeneous catalysis device comprising a region for transformation of a gas or of a liquid comprising at least one powder based on cerium oxide treated according to the process of the present invention or comprising at least the powder comprising nanoholes which is mentioned above. According to one embodiment, the heterogeneous catalysis device comprises a honeycomb support, for example made of alumina, the walls of which are coated with a powder based on cerium oxide treated according to the process of the present invention or with a powder comprising nanoholes which is mentioned above.

According to one embodiment, the heterogeneous catalysis device is a catalytic converter, targeted at limiting the harmfulness of the exhaust gases from motor vehicles. Promoters based on cerium oxide having an improved low-temperature reactivity in combination with oxidation catalysts, such as platinum (Pt), are thus obtained. It is thus possible to envisage advantageously reducing the amount and the cost of a catalyst used in a catalytic converter.

The working temperature of a powder based on cerium oxide treated according to the process of the present invention or of a powder comprising nanoholes which is mentioned above is greater than or equal to 50° C., indeed even greater than or equal to 100° C., during heterogeneous catalysis in a catalytic converter.

The substrates using promoters based on cerium oxide which are treated according to the invention can be used in many other technical fields, such as, for example, those relating to fuel cells or to the treatment of oil or petroleum products, for example to facilitate the oxidation of CO during the regeneration of a catalyst in a fluid bed catalytic cracking process.

BRIEF DESCRIPTION OF THE DRAWINGS

Other distinguishing features and advantages of the present invention will emerge in the description below of non-limiting implementation of examples, in particular with reference to the appended drawings, in which:

FIGS. 2.a to 2.b illustrate advantageous experimental yields (expressed in arbitrary units (AU)) obtained in converting hydrogen into water at different temperatures, with ceria ($CeO_2$) and ceria-zirconia ($Ce_{0.7}Zr_{0.3}O_2$) which are treated according to the process of the invention;

For reasons of clarity, the dimensions of the different components represented in these figures are not necessarily in proportion with their true dimensions. The same numerical references in the different figures correspond to the same parts.

DETAILED DESCRIPTION

Figure 1:
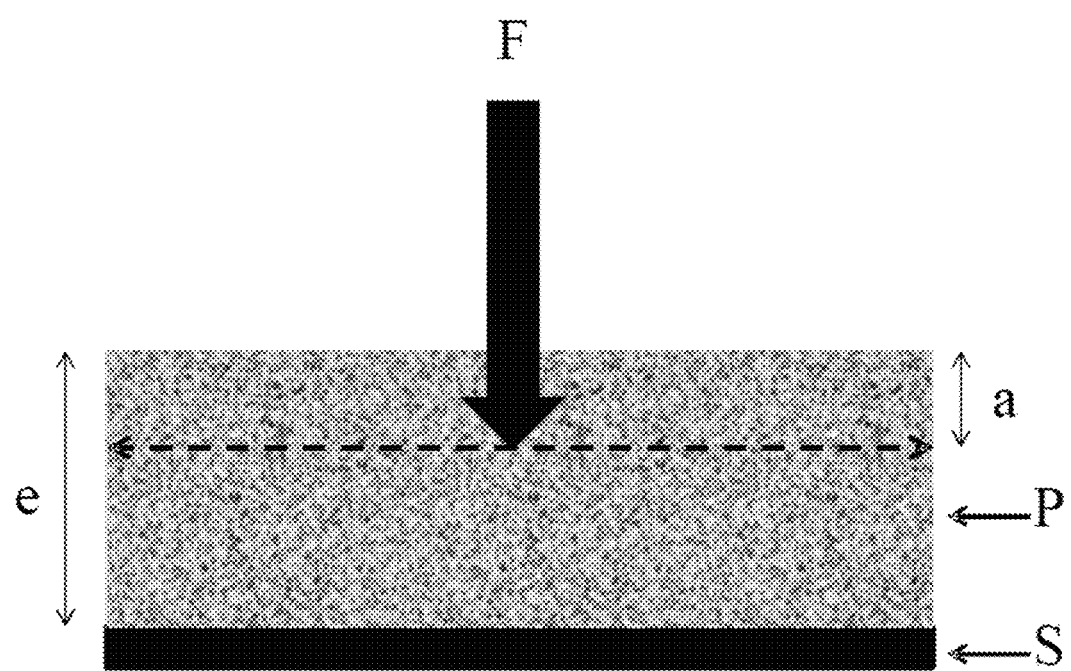
FIG. 1 illustrates the treatment by an ion beam of a powder (P) spread over a surface (S), the specific parameters of the treatment being specified as a thickness (e) of the powder to be treated and the distance (a) covered by the incident ions in the powder. A binomial powder mixing model was constructed by the inventors on the basis of this figure: in each mixing operation, a powder grain has a probability p=(a/e) of being within the region exposed to the beam and a probability $q=(1-(a/e))$ of being outside the reach of the beam, with $p+q=1$.

According to examples of the implementation of the present invention, samples, ceria ($CeO_2$) and also ceria-zirconia ($Ce_{0.7}Zr_{0.3}O_2$) powders, were mixed and spread before each treatment over a surface made of aluminum and formed the subject of experimental studies for treatment with nitrogen ions emitted by an ECR source. The treatment consisted in repeating 16 times the same procedure comprising the following stages: firstly, mixing and uniform spreading of 150 mg of powder over a square surface of 100 cm² with a fine brush, secondly, treatment of the spread powder with a beam with a diameter of 40 mm, moving at a rate of 80 mm/s, with an amplitude of movement of 60×40 cm, 11 passes (corresponding to an advance of the beam of 30%), in order to achieve a dose of ions per unit of surface area equal to $5 \times 10^{15}$ ions/cm² at the end of each treatment; after having repeated the procedure 16 times, the total treatment dose accumulated by the 150 mg of powder spread over 100 cm² is equal to $16 \times 5 \times 10^{15} \times 100$, i.e. $8 \times 10^{18}$ ions, which amounts to a total treatment dose per unit of weight of powder equal to $5 \times 10^{19}$ ions/gram of powder. The inventors estimate that the dose range in order to have a particularly effective treatment should preferably be between $10^{18}$ ions/gram and $10^{20}$ ions/gram of powder. The degree of treatment was evaluated at 80%, for a distance covered by the nitrogen ion at 50 keV in a ceria or ceria-zirconia powder evaluated at 0.2 microns and a thickness of ceria or ceria-zirconia powder, spread over 100 cm², evaluated at 2 microns, i.e. 10 times the distance covered by the ion.

The ion beam which was used to treat the preceding powders comprises $N^+$ ions, the intensity of which is substantially equal to 0.58 mA, $N^{2+}$ ions, the intensity of which is substantially equal to 0.32 mA, and finally $N^{3+}$ ions, the intensity of which is substantially equal to 0.1 mA; the extraction and acceleration voltage of these ions is 35 kV; the $N^+$ energy is 35 keV, the $N^{2+}$ energy is 70 keV and the $N^{3+}$ energy is 105 keV. It is estimated that the mean energy of these ions is approximately 50 keV.

An experimental study in order to evaluate the impact of the treatment on the conversion of hydrogen into water as a function of the temperature was subsequently carried out on virgin and treated ceria and ceria-zirconia powders. This study consisted in injecting, into a cell, a stream of 5% hydrogen ($H_2$) in a stream of argon (Ar), in a proportion of 25 cm³ min⁻¹, the temperature being varied between 30 and 800° C. according to a gradual rise in the temperature of 7.5° C./min. The degree of formation of water was measured as a function of the temperature at the surface or in the body of the virgin and treated powder.

Such tests are representative of the reactions encountered in three-way catalytic converters, where cerium oxide compounds-buffers are added to alumina of a support in order to limit the impact of the variations in composition of the gases by storing oxygen when it is in excess in order to discharge it when it is in deficit.

In order to validate the impact of the treatment by ionic bombardment of the cerium oxide powders for three-way catalytic converters, the inventors thus studied the reaction for the oxidation of hydrogen under the water form in the presence of cerium oxide, with or without contribution of platinum. This is because the reaction for the oxidation of hydrogen under the water form is very similar to and representative with regard to the chemical reactions of both types of oxidation reactions occurring in the three-way catalytic converter, namely that of carbon monoxide to give carbon dioxide and that of the nonincinerated gases with formation of water. Tables 1 and 2 and associated figures illustrate the improvements observed by the inventors and based on this reaction for the oxidation of hydrogen are obtained with cerium oxide powders treated according to the process of the invention. These observed improvements can be easily transposed, in terms of efficiency, to the oxidation reactions occurring in the three-way catalytic converter.

Experimental results obtained for the reduction temperature at the surface and in the body for a virgin and treated ceria are recorded in table 1 and experimental results obtained for a virgin and treated ceria-zirconia are recorded in table 2.

TABLE 1

| $CeO_2$ sample | Estimated doses ($10^{17}$ ion/g of powder) | Reduction temperature at the surface (° C.) | Reduction temperature in the body (° C.) |
| --- | --- | --- | --- |
| Virgin | 0 | 340 | 780 |
| 10 | 5 | 280 | 770 |

TABLE 2

| $Ce_{0.7}Zr_{0.3}O_2$ sample | Estimated doses ($10^{17}$ ion/g of powder) | Reduction temperature at the surface (° C.) | Reduction temperature in the body (° C.) |
| --- | --- | --- | --- |
| Virgin | 0 | 358 | 561 |
| 10 | 5 | 270, 305, 370 | 408 |

It is found, in table 1, that, for the treated ceria, the reduction temperature at the surface is very advantageously decreased, changing from 340 to 280° C., i.e. a decrease of 60° C.; the temperature in the body is decreased much less, changing only from 780° C. to 770° C.

It is observed, in table 2, that, for the treated ceria-zirconia, the reduction temperature at the surface is very advantageously decreased at the surface, changing from 358 to 270°, i.e. a decrease of 88° C.; it is decreased much more in the body, changing from 561° C. to 408° C., i.e. a decrease of 153° C.

FIGS. 2.a and 2.b give the details of these results respectively for the ceria powder and the ceria-zirconia powder. The axis of the abscissae represents the axis of the temperatures on which movement takes place at the rate of 7.5° C./min and the axis of the ordinates represents the degree of production of water (expressed in arbitrary units). It is observed that, in FIG. 2.a, the curve (2) associated with the ceria powder treated according to the process of the invention very favorably breaks away from the curve (1) associated with the virgin ceria powder in the temperature region between 100° and 500° C.; the degree of production of water is twice as high there. Likewise, in FIG. 2.b, the curve (2) associated with the ceria-zirconia powder treated according to the process of the invention differs in a massive and high degree of production of water in a temperature range of less than approximately 200° C., with respect to the degree of the curve (1) associated with the virgin ceria-zirconia powder.

The inventors were thus able to experimentally identify a particularly advantageous operating point of the process of the invention applied to powders based on cerium oxide, for a total dose per unit of weight of powder to be treated ($5 \times 10^{19}$ ion/g of powder) and a degree of treatment (80%). The inventors recommend broadening this operating point, preferably to a total dose range, as number of ions per unit by weight of powder to be treated, of $10^{18}$ and $10^{20}$ ion/g and to a range of degree of treatment of greater than 10%, preferably greater than 50%.

The total dose per unit of weight of powder to be treated being fixed within the range recommended be; pw, the inventors have attempted, on the basis of a simple empirical model set out in FIG. 1, to understand and to estimate the degree of treatment of a powder as a function of the conditions employed by the process of the invention, such as the amount of powder, its spreading surface area or even the type and the energy of the ion of the beam. The treatment of a powder (P) spread over a substrate (S) according to an unchanging thickness (e), partially traversed by an ion beam (F), the reach of which into the powder delimits a region of travel with a maximum depth (a), is illustrated in FIG. 1. Below this region, the powder grains are not affected by the beam. This treatment model assumes that, at each mixing operation and before each treatment, a powder grain can be located in the region of travel of the incident ions or outside the same region. An increase in the region of travel of the incident ion, an increase in the mixing number or a reduction of the thickness of the powder to be treated, obtained by reduction in the amount of powder or by an increase in the spreading surface area, are so many factors which favor the probability of a powder grain being exposed at least once to the beam. The inventors have been able to quantify the impact of these factors on the degree of treatment; the associated trends are illustrated in FIGS. 3, 4 and 5.

Figure 3:
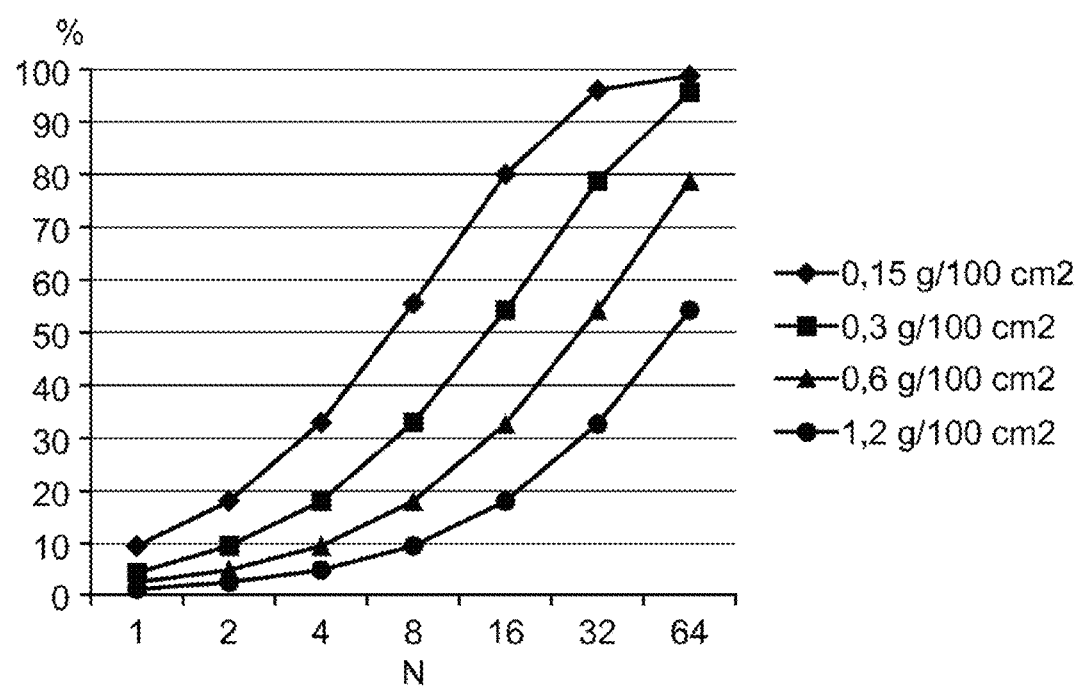
FIG. 3 indicates, by extrapolation, the degree of treatment of a powder based on cerium oxide (on the ordinate, expressed as %) by a beam of nitrogen ions with a mean energy of 50 keV, as a function of the amount of powder spread over a surface area of 100 cm² and of the total number of mixing operations N (on the abscissa), each being carried out before each treatment by an ion beam. This extrapolation is based on the powder treatment model set out in FIG. 1. The inventors estimate that a minimum degree of treatment equal to 10% is desirable on a powder and that it is preferable for this degree to be greater than 50%.

The impact of the spreading of a given amount of powder based on cerium oxide on the degree of treatment of the powder is represented in FIG. 3. The beam is composed of nitrogen ions with a mean energy of approximately 50 keV, covering a mean distance of 0.2 micron in the powder. For a spreading of 0.15 mg of cerium oxide powder spread over 100 $cm^2$ and treated according to 16 mixing operations, the degree of treatment of the powder grains is approximately 80% (treatment conditions of the powders studied experimentally). It is observed that, in order to increase the efficiency of the mixing by 15%, changing from a degree of treatment of 80% to 95%, the mixing number can be multiplied by 2; otherwise it is possible to provide a more powerful mixing system. In order to achieve a minimum degree of treatment of 10%, the mixing number can be multiplied by 2 when the amount of powder to be treated is multiplied by 2.

Figure 4:
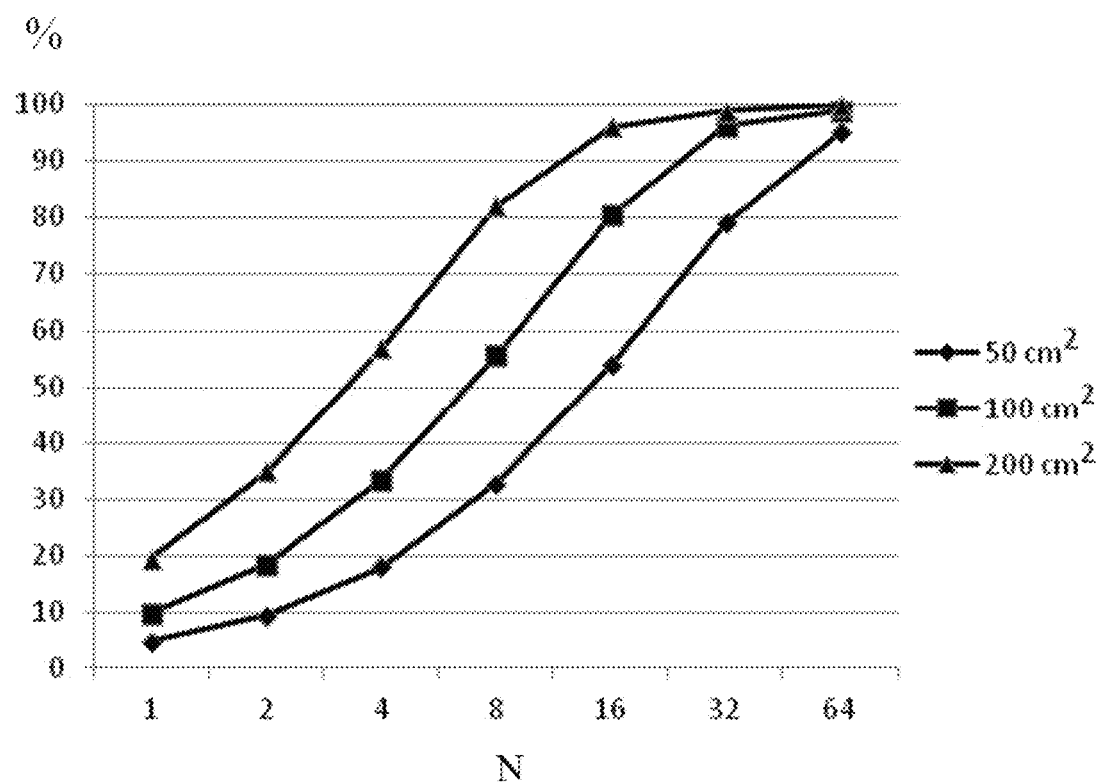
FIG. 4 indicates, by extrapolation, the degree of treatment of a cerium oxide powder (on the ordinate, expressed as %) by a beam of nitrogen ions with a mean energy of 50 keV, for an amount of powder fixed at 0.15 mg, spread over 3 surfaces with respective areas equal to 50, 100 and 200 cm², as a function of the total number of mixing operations N (on the abscissa), each being carried out before each treatment by the ion beam. This extrapolation is based on the powder treatment model set out in FIG. 1. The inventors estimate that a minimum degree of treatment equal to 10% is desirable on a powder and that it is preferable for this degree to be greater than 50%.
Figure 5:
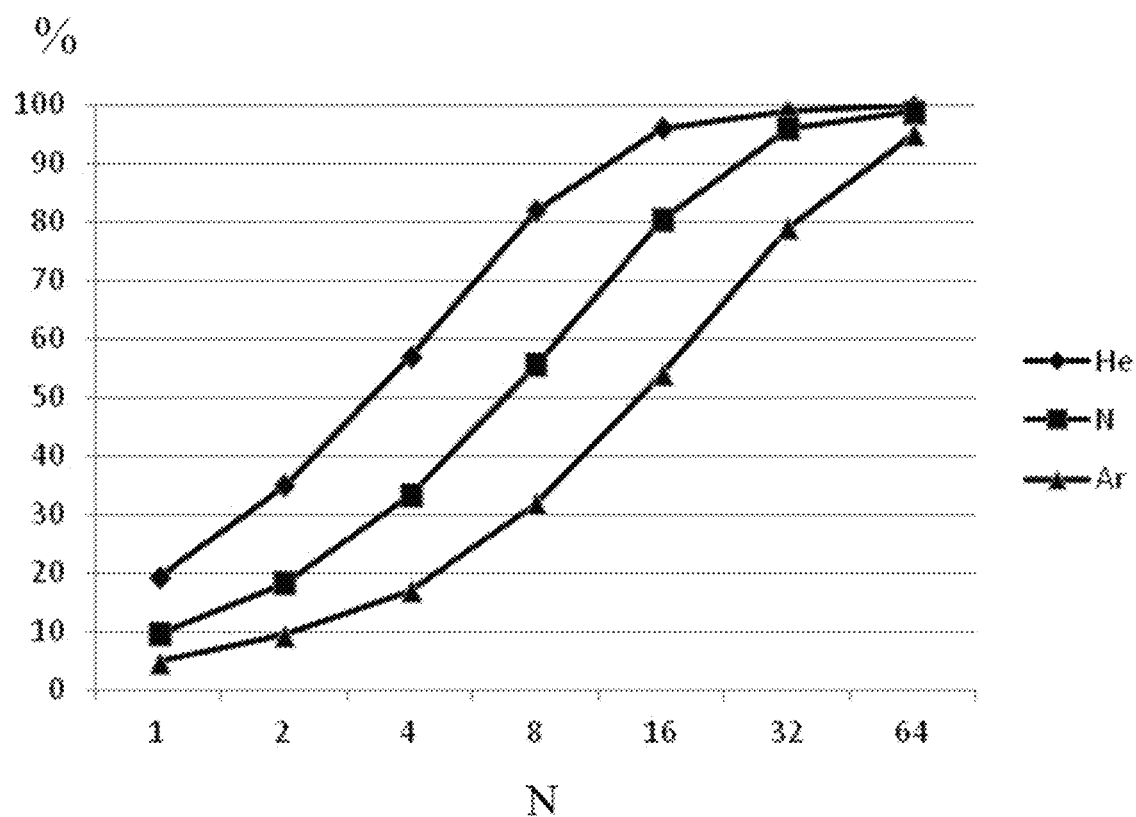
FIG. 5 indicates, by extrapolation, the degree of treatment of a cerium oxide powder (on the ordinate, expressed as %), as a function of several types of ions (from the lightest, He, to the heaviest, Ar), with an energy of 50 keV, for an amount of powder fixed at 0.15 mg spread over a surface area fixed at 100 cm², as a function of the total number of mixing operations N (on the abscissa), each being carried out before each treatment by the ion beam. This extrapolation is based on the powder treatment model set out in FIG. 1. The inventors estimate that a minimum degree of treatment equal to 10% is desirable on a powder and that it is preferable for this degree to be greater than 50%.

The impact of the spreading of a given amount of powder based on cerium oxide on the degree of treatment of the powder is represented in FIG. 4. The beam is composed of nitrogen ions with a mean energy of approximately 50 keV, covering a mean distance of 0.2 micron in the powder.

Under the experimental conditions expressed above, 0.15 mg of powder spread and treated over 100 $cm^2$ has a thickness of approximately 2 microns. The reach of the ions is approximately 0.2 micron. For 16 mixing operations, the inventors estimated that the powder had been treated with a degree of 80%. In order to increase the amount of powder to be treated by a factor of 2, the number of mixing operations can be increased by a factor of 2 in order to obtain an identical degree of treatment.

In order to experimentally evaluate the impact of the surface area on the treatment of 150 mg of alumina powders with a total dose of $8 \times 10^{17}$ nitrogen ions, i.e. $5 \times 10^{19}$ ion/g of alumina powder, according to different spreading surface areas equal to 1200 $cm^2$, 100 $cm^2$ and 100 $cm^2$, associated with a number of respective mixing operations equal to 2, 2 and 16, the inventors carried out an X-ray photoelectron spectroscopy (XPS analysis), also known as electron spectroscopy for chemical analysis (ESCA), of the powder. They were able to observe that the spectrum of the powder showed virtually no change in the first two cases, as if the powder grains had not been significantly exposed to the beam, unlike the third case, for which the electrostatic charges deposited by the beam on the powders made it impossible to carry out the XPS analysis. The inventors concluded that, in the first case, the powder thickness, estimated on average at 0.3 micron, which may be much less than 0.1 micron in places, appeared too low to be effectively treated by a beam, the distance covered of which in the powder is approximately 0.3 to 0.4 micron. The inventors recommend, preferably, spreading a given amount of powder over a surface area calculated in order for the thickness (e) to be at least equal to twice the mean distance covered by the ion in said powder. In the example of the second case, the mixing number was not sufficient; the inventors evaluated a degree of treatment of approximately 10% (based on the model of FIG. 1 applied to alumina powders) in order to obtain a significant signature by the XPS analysis. On this basis, the inventors recommend, preferably, a minimum mixing number which makes it possible to achieve a minimum degree of treatment at least equal to 10%. In the third case, the inventors observed that the powder grains were predominantly exposed to the beam in so far as they retain a persistent electrical charge, which makes the XPS analysis impossible. The inventors evaluated the degree of treatment at 60%, six times greater than that of the second case, estimated at 10%. On this basis, the inventors recommend, preferably, a minimum number of mixing operations which makes it possible to achieve, preferably, a degree of treatment of the powder grains at least equal to 50%.

The impact of the choice of the type of ion on the degree of treatment, for 150 mg of powder based on cerium oxide spread over 100 cm$^2$, is illustrated in FIG. 5. For any degree of treatment, it is observed that, for one and the same identical mixing number, helium makes possible a degree of treatment 60% greater than that of nitrogen, which has a degree of treatment 60% greater than that of argon. On this basis, the inventors recommend, preferably, the use first of light ions, such as helium (He), boron (B), carbon (C), nitrogen (N), oxygen (O) or neon (Ne).

It should be remembered that the calculation of the degree of treatment of a powder based on the distance covered by an ion in a given metal oxide, a given incident ion with a given energy is based on the principles of the physics of the interactions of particles with matter. Methods and data which make it possible to carry out these calculations are disclosed in particular in the publications "*The Stopping and Range of Ions in Matter*" by J. F. Ziegler, volumes 2-6, Pergamon Press, 1977-1985, "*The Stopping and Range of Ions in Solids*" by J. F. Ziegler, J. P. Biersack and U. Littmark, Pergamon Press, New York, 1985 (new edition in 2009), and J. P. Biersack and L. Haggmark, Nucl. Instr. and Meth., vol. 174, 257, 1980.

In addition, software has been developed and sold in order to facilitate or carry out such calculations, such as, for example, the software sold under the "SRIM" ("*The Stopping and Range of Ions in Matter*") and "TRIM" ("*The Transport of Ions in Matter*") names, developed in particular by James F. Ziegler.

It is obvious that it is possible to combine the calculations and results set out so as to determine the desired number of mixing operations on a given spreading surface, in order to carry out the treatment of an amount of powder with a degree of treatment desired for the possible combinations, in particular of type of metal oxide powder, of type of ion for the treatment, of the energy of these ions.

It is thus possible to carry out the choice of the dose of ions per gram of powder to be treated and of the number of mixing operations to be carried out on a spreading surface so as to treat the latter predictively.

It should be noted that experimental observations on samples which have formed the subject of treatment by an ion beam can make it possible to confirm or adjust the range of dose of ions selected and the mixing number selected. Such observations can in particular be carried out by XPS, in order to refine the mixing, or by measurement of the temperature for reduction of the treated powder, in order to optimize the dose required.

In order to extrapolate the preceding results to a system of vibrating mixing (bowl, plate, and the like) under a beam, the inventors recommend, for example, characterizing a system by depositing a layer of powder based on cerium oxide colored white on a layer of powder based on cerium oxide colored black and observing, as a function of the vibration time, the statistical mixing of the white and black grains at the surface of the powder as a function of the time with the aim of establishing a connection between the number of mixing operations and the vibration time of the device. At the time t0=0, 100% of the powder grains at the surface are white. When, at a characteristic time t1, 25% of the grains are white and 75% of the grains are black, the inventors estimate that 50% of the blended black and white powder grains have been exposed at least once to the beam. A correspondence between the mixing system with a vibrating device and the mixing system described above can thus be established, for which system it is possible to determine, with the binomial statistical model of FIG. 1, the mixing number necessary to treat, with a given degree of treatment, a powder, the amount of which is equal to the amount of white powder and black powder, the thickness of which is equal to the sum of the thicknesses of white powder and black powder and the spreading surface area of which is equal to that of the white powder, which is itself equal to that of the black powder. It is thus easy to proportionally link a mixing number to a duration of vibration of the device and to extrapolate these results in order to know, for example, the vibration time of the device in order to have a degree of treatment of the powder grains equal to 80%.

The methodologies presented in the examples above allow a person skilled in the art to easily find the means for employing the process of the present invention via simple preliminary tests liable to specify the favorable treatment conditions in accordance with the ranges indicated.

The invention is not limited to the implementational types exemplified and should be interpreted nonlimitingly and encompasses any equivalent embodiment. It should be noted that, while implementational examples with powders based on cerium oxide have been presented, the process according to the invention can be employed with a great many mixing systems and a great many metal oxide powders comprising cerium for the purpose of obtaining an increase in the porosity making possible better storage and better release of oxygen at the nanoscopic scale.

The invention claimed is:

1. A heterogeneous catalysis device, comprising:
    a region of transformation of a gas or of a liquid adapted to receive the gas or liquid for treatment,
    a powder based on cerium oxide disposed in the region and arranged to contact the gas or liquid for treatment, the powder based on cerium oxide having a cumulative dose of ions from prior ion bombardment treatment of between $10^{16}$ ions/gram of powder and $10^{22}$ ions/gram of powder, the ions being selected from ions of elements selected from the group consisting of helium (He), boron (B), carbon (C), nitrogen (N), oxygen (O), neon (Ne), argon (Ar), krypton (Kr) and xenon (Xe), wherein the powder based on cerium oxide comprises nano-holes having a greatest dimension of greater than or equal to 10 nm and a smallest dimension greater than equal to 1 nm.

2. The device of claim 1, wherein the device further comprises a honeycomb support, wherein one or more walls of the honeycomb support are coated with the powder based on cerium oxide.

3. The device of claim 2, wherein the honeycomb support is formed of alumina.

4. The device of claim 1, wherein the device is a catalytic converter.

5. The device of claim 1, wherein the powder based on cerium oxide is selected from the group consisting of ceria (CeO$_2$) powder and a mixed cerium and zirconium oxide powder.

6. The device of claim 1, wherein the ions are selected from ions of elements selected from the group consisting of helium (He), boron (B), carbon (C), nitrogen (N), oxygen (O) and neon (Ne).

7. The device of claim 1, wherein the powder based on cerium oxide has a cumulative dose of ions from the prior ion bombardment treatment of between $10^{18}$ ions/gram of powder and $10^{20}$ ions/gram of powder.

8. The device of claim 1, wherein the powder has a grain size of about 10 nm to about 5 micrometers.

9. The device of claim 1, further comprising an oxidation catalyst disposed in the region.

10. The device of claim 9, wherein the oxidation catalyst is platinum.

11. The device of claim 1, wherein a working temperature of the powder based on cerium oxide is greater than or equal to 50° C. during heterogeneous catalysis.

12. The device of claim 11, wherein the working temperature of the powder based on cerium oxide is greater than or equal to 100° C. during heterogeneous catalysis.

13. The device of claim 5, wherein the mixed cerium and zirconium oxide powder is a ceria-zirconia ($Ce_{0.7}Zr_{0.3}O_2$) powder.

\* \* \* \* \*